Oct. 7, 1958  J. D. LAFITTE  2,854,917
AUTOMATIC MACHINE FOR MAKING COFFEE AND OTHER INFUSIONS
Filed June 17, 1957  2 Sheets-Sheet 1

INVENTOR:
Jacques Daniel Lafitte
By Walter Buhr
Patent Agent

Oct. 7, 1958 J. D. LAFITTE 2,854,917
AUTOMATIC MACHINE FOR MAKING COFFEE AND OTHER INFUSIONS
Filed June 17, 1957 2 Sheets-Sheet 2

INVENTOR:
Jacques Daniel Lafitte
By
Patent Agent

United States Patent Office 2,854,917
Patented Oct. 7, 1958

2,854,917

AUTOMATIC MACHINE FOR MAKING COFFEE AND OTHER INFUSIONS

Jacques Daniel Lafitte, Asnieres, France

Application June 17, 1957, Serial No. 666,183

Claims priority, application France July 25, 1956

6 Claims. (Cl. 99—283)

This invention relates to an automatic machine for making coffee and other infusions, comprising a double-acting jack whose piston is connected by a rod to a measuring piston slidable in a cylinder connected to a hot water source.

According to the invention, the machine, which comprises a double-acting jack whose piston is connected by a rod to a measuring piston slidable in a cylinder connected to a hot water source, is controlled by a four-way reversing cock allowing the intake of liquid under pressure to circulate in one compartment or the other of the double-acting jack; the reversing of the cock is controlled by a cam placed in the infusion-holder cup acting on a loose roller placed in a hood which transmits its movement by a bushing; the latter drives a lever integral with an engageable socket, said lever, in its turn, activates another lever acting on the cock.

According to other characteristics of the invention, an arm integral with the bushing fixed on the shaft acts as a bearing point for a spring tending to bring the aforementioned shaft to the neutral position against the action of the cam attached to the infusion-holder cup.

The socket co-operating with the bushing integral with the driving shaft is loosely mounted on the latter and is applied to the bushing by a spring concentric to the shaft.

The mobile socket carries a first arm on which a second arm is fixed connected by an adjustable rod to the control of the four-way reversing cock.

A spring connects the adjustable rod to the first arm of the free socket.

The first arm of the free socket has a boss at its free end on to which a spring is hooked, tending to bring the arm and socket to their neutral position.

Various other characteristics of the invention will moreover be revealed by the detailed description which follows.

One form of embodiment of the purpose of the invention is shown, by way of example, in the attached drawing.

Figure 1:
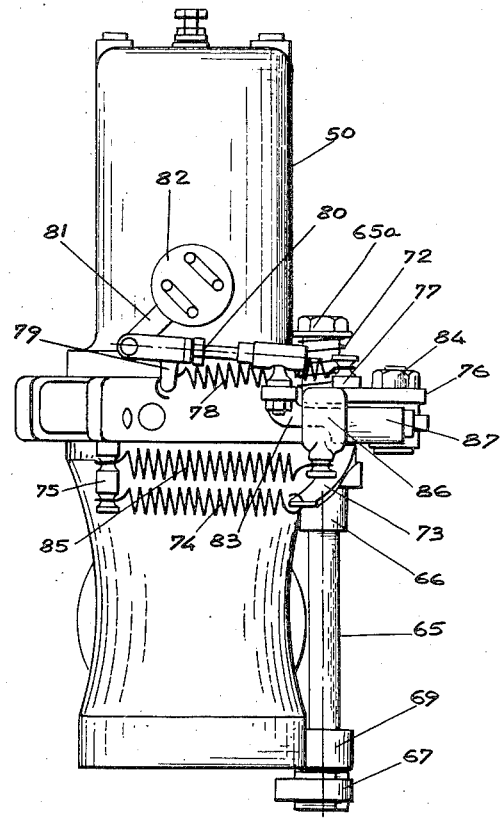
Fig. 1 is a front elevation of the machine for making infusions.

In Fig. 1, the machine for making infusions comprises a boiler, (not shown) on which one or more units 50 are fixed for making the infusion.

Each unit 50 for making the infusion consists of a double-acting jack 51 (Fig. 2) formed by a cylinder 52 and a piston 53 therein. The cylinder 52 rests on a measuring cylinder 54 having a piston 55 movably mounted therein. The numeral 56 designates a connecting rod connecting the upper piston 53 to the lower piston 55. The bottom of the cylinder 52 is closed by a cylindrical part 57 comprising grooves for accommodating washers 58, 59, 60 for sealing purposes.

The measuring cylinder 54 is provided with a connection 61 and a nozzle 62 for connecting cylinder 54 with a boiler (not shown).

Each of the two bosses 63, 64 cast on to the measuring cylinder has a bore therethrough through which extends, on one hand, a shaft 65, and on the other hand, a bushing threaded on to the shaft 65. At its lower end, shaft 65 carries a fork-shaped holder 67 with a pin 68 rotatably supporting a roller 69. Shaft 65 extends upwardly beyond the bushing 66, and terminates in a head 65a. A socket 70 engaged by the upper part of shaft 65 comprises at least one housing intended to co-operate with a step 66a of the bushing 66. A circular groove 71 is cut in the socket 70. A spring 72, coaxial with shaft 65 thrusts the socket 70 from the head 65a on to the bushing 66. An arm 73 (Fig. 1), integral with the bushing 66 is connected at its free end to one end of a spring 74 the other end of which is hooked on to a rod 75 fixed to the body of the unit 50. The socket 70 carries an arm 76 with a stud 77 having connected thereto one end of a spring 78 the other end of which is hooked on to an extension 79 of an adjustable rod 80, which latter is hinged, on one hand, to the operating lever 81 of a four-way reversing cock 82, and on the other hand, on an arm 63 integral with the arm 76 through the intermediary of a spindle 84. A spring 85 attached at one of its ends to the rod 75 is hooked at its other end on to the lower part of a boss 86 integral with the end of the arm 76. A damper 87 is mounted on the arm 83 or 76. Reference numeral 88 designates a manual control for the four-way cock 82.

Piping (not shown) connects, on one hand, the four-way cock 82 to a generating unit of liquid under pressure, and on the other hand, to the lower part and upper part of the cylinder 52 containing the piston 53.

A lever 89 placed in the body of the unit 50 is hinged at its end 89a to a spindle 90 integral with the body of the unit. The lever 89 has its front part 89b designed as an offset finger 91 engaging the groove 71 of the socket 70.

A latch 92, which is hinged on a pivot 93 integral with the lever 89, can be housed in a cavity 94 cut laterally in the lever 89.

The lower part of the measuring cylinder 54 comprises a cavity 95 intended to receive a cup 96 provided with a handle 97 and a lateral cam 98. 99 designates a filter placed at the bottom part of the measuring cylinder 54.

Figure 4:
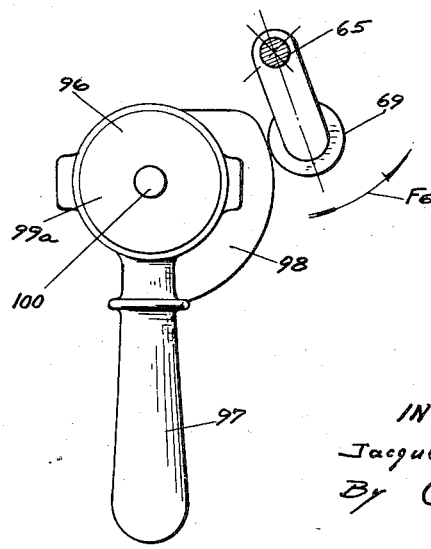
Fig. 4 shows some detailed parts of the machine.
Figure 2:
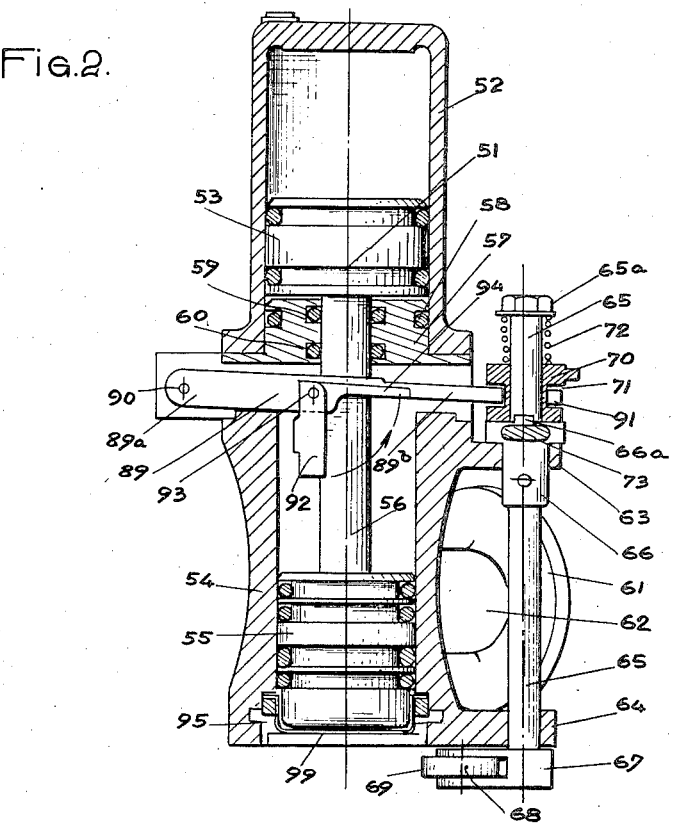
Fig. 2 is a vertical axial section through the machine of Fig. 1.
Figure 3:
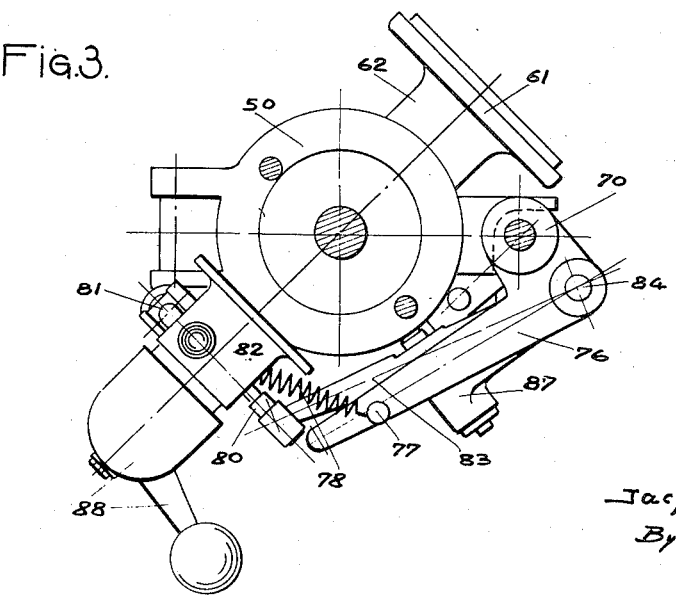
Fig. 3 is a top view of the machine shown in Fig. 1.

The unit operates as follows:

When the unit is not in use, the members assume the position shown in Fig. 2. The infusion-holder cup 96 is separated from the measuring cylinder 54. The machine supplying the liquid under pressure is then started up. As soon as an infusion is required to be made, the article for infusion is placed in the cup 96, whereupon the latter is hooked under the measuring cylinder 54. The mounting of this cup on the measuring cylinder has the effect of bringing the cam 98 into contact with the roller 69 and causing the shaft 65 to pivot in the direction of the arrow $F_6$ (Fig. 4).

This rotative movement of shaft 65 brings about a rotation of the arms 73, 76 and 83 due to the fact that the socket 70 is engaged on the step 66a of the bushing 66. The springs 74 and 85 are tensioned; the spring 78 being stronger than the resistance offered by the cock, remains under tension and actuates the adjustable rod 80 which causes the control 81 of the four-way reversing cock 82 to pivot. The controlling liquid under pressure arrives by the cock 82 in the bottom of the cylinder 52 and causes the piston 53 to rise. The latter, by means of the rod 56, drives the piston 55, which, by rising, sucks in the hot water from the boiler (not shown), and on which the unit is mounted. When the piston 55 has completed half of its stroke in the upper part of the measuring cylinder 54, it encounters the latch 92 placed vertically which raises the lever 89 to which it is attached. In its movement, this lever lifts the socket 70 which thus disengages the step 66a.

This movement has the effect of compressing the spring 72 and freeing the socket 70 which pivots under the action of the spring 85 and returns the arms 76 and 83 to their first position. The latter cause the four-way reversing cock 82 to pivot. The direction taken by the liquid under pressure is reversed, and as a result thereof, the piston 53 moves downwardly, the lower compartment of the cylinder 52 being put under normal pressure.

The piston 55 is moved downwardly by the movement of the piston 53 and forces the hot water through the filter 99 and the cup 96 whose lower part 99a is pierced by a duct 100, through which the infusion escapes.

When the piston 53 reaches the position shown in Fig. 2, the operation cycle of operation is terminated. The unit is ready for a new cycle of operation after having withdrawn the cup 96, which causes the shaft 65 to return to the disengaged position under the action of the spring 74.

When a larger quantity of liquid is required, the latch 92 is placed into horizontal position in the cavity 94 so that the piston 55 will come into contact with the lever 89 at a higher position.

In certain cases, the socket 70 is folded of two elements screwed into each other so as to take up the play caused by the wear of the edges of the groove 71.

Should the quantity of liquid require to be doubled while leaving the infusion-holder cup in position, it is only necessary manually to operate the control 88 which is operatively connected to the lever 81 of the cock 82. The lever 81, by means of the adjustable rod 80 and the lever 83, returns the arm 76 to the same position when the infusion-holder cup is positioned; the spring 72 again engages the socket 70 in the step 66a; the spring 85 is tensioned again, and the cycle of operation described above is repeated.

The spring 78 has the object of preventing the members of the unit from being damaged, during faulty operation or if the cock siezes up.

In the foregoing, reference has been made to a unit-machine supplying a liquid under pressure, this liquid ensuring the working of a double-acting jack 51. This unit can consists of a pump, a motor and a tank providing liquid under pressure, but a compressed air unit can also be employed, or even liquid under pressure distributed by another private or public installation.

Various modifications can moreover be applied to the form of embodiment given by way of example, without going outside the scope of the invention.

I claim:

1. In combination in an automatic machine for making coffee and other infusions: a first cylinder, a double acting piston reciprocally mounted in said first cylinder, a reversible four-way valve associated with said first cylinder and movable into a first and into a second position for respectively conveying fluid under pressure to one side or the other side of said double acting piston, a second cylinder arranged to receive hot water, a measuring piston reciprocably mounted in said second cylinder, a connecting rod interconnecting said two pistons, said second cylinder having a discharge opening at one end thereof, means adjacent said one end for receiving a filter, an infusion holder cup having a cam surface and being adapted detachably to be inserted into said discharge opening, sensing means arranged for cooperation with said cam surface and operable in response to the insertion of said cup into said discharge opening to carry out a certain control movement, movement transmitting means operatively connecting said sensing means to said four way valve for conveying said control movement to said four way valve to move the latter into said first position whereby said double acting piston is caused to impart an intake stroke upon said measuring piston, said movement transmitting means including coupling means effective during said intake stroke of said measuring piston, abutment means operatively connected with said coupling means and operable by said measuring piston near the end of its intake stroke to disengage said coupling means and thereby to interrupt said movement transmitting means, and means responsive to the disengagement of said coupling means for shifting said four way valve into its second position to thereby cause said double acting piston to impart a discharge stroke upon said measuring piston.

2. An automatic machine for making coffee and other infusions according to claim 1, characterized in that an arm, integral with the bushing fixed on the shaft, acts as bearing point for a spring tending to bring the aforementioned bushing and shaft to the disengaged position against the action of the cam fixed on the infusion-holder cup.

3. A machine according to claim 1 characterized in that the socket co-operating with the bushing integral with the driving shaft is loosely mounted on the latter and applied to the bushing by a spring concentric to the shaft.

4. A machine according to claim 1 characterized in that the mobile socket carries a first arm on to which a second arm is fixed connected by an adjustable rod to the control of the four-way reversing cock.

5. A machine according to claim 4 characterized in that a spring connects the adjustable rod to the first arm of the free socket.

6. A machine according to claim 4 characterized in that the first arm of the free socket carries a boss at its free end on to which a spring is hooked tending to return the arm and socket to their disengaged position.

References Cited in the file of this patent

UNITED STATES PATENTS 2,783,704   Liebelt _____ Mar. 5, 1957

FOREIGN PATENTS 477,276   Italy _____ Jan. 16, 1953